(No Model.)
H. R. HARRIS.
SHAFT OR POLE FASTENER.
No. 593,355. Patented Nov. 9, 1897.
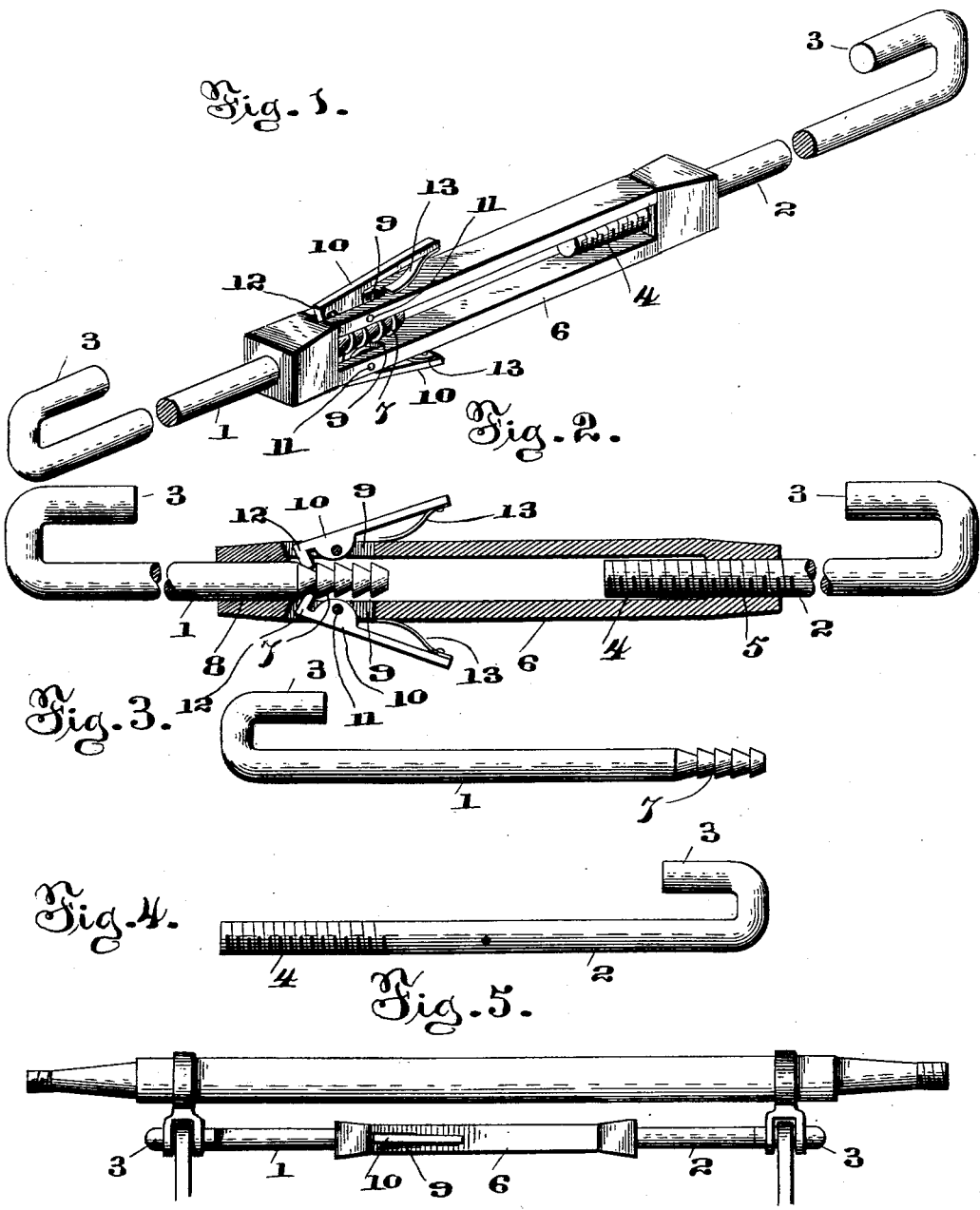
WITNESSES
INVENTOR
Henry R. Harris
By John Hedderburn
Attorney

UNITED STATES PATENT OFFICE.

HENRY R. HARRIS, OF REELFOOT, TENNESSEE.

SHAFT OR POLE FASTENER.

SPECIFICATION forming part of Letters Patent No. 593,355, dated November 9, 1897.

Application filed January 12, 1897. Serial No. 618,927. (No model.)

*To all whom it may concern:*

Be it known that I, HENRY R. HARRIS, a citizen of the United States, residing at Reelfoot, in the county of Lake and State of Tennessee, have invented certain new and useful Improvements in Shaft or Pole Fasteners for Vehicles; and I do hereby declare the following to be a full, clear, and exact description of the invention, such as will enable others skilled in the art to which it appertains to make and use the same.

This invention relates to shaft or pole fasteners for vehicles, and has for its object to provide a simple, cheap, and efficient fastening device which is extensible in length and adapted to be applied to vehicles of different widths, the said fastener making it possible to instantly and easily attach and detach the shafts or pole, at the same time preventing said shafts or pole from dropping to the ground.

To this end the invention consists in certain novel features and details of construction and arrangement of parts, as hereinafter fully described, illustrated in the drawings, and incorporated in the claims.

In the accompanying drawings, Figure 1 is a detail perspective view of a fastener constructed in accordance with this invention. Fig. 2 is an enlarged section through the same. Fig. 3 is a plan view of one of the hooked end portions of the device. Fig. 4 is a similar view of the other end portion. Fig. 5 is a detail plan view showing the improved fastener in its applied position to the axle and thill-irons of the tongue or shafts.

Similar numerals of reference designate corresponding parts in the several figures of the drawings.

The improved fastener contemplated in this invention comprises two substantially similar end portions 1 and 2, each having its outer end bent back to form a hook 3, the extremity of which is adapted to pass through the openings in the ears of one of the clips on the axle for securing the eye of the thill-iron between the same. One of the end portions or members 2 has its inner end screw-threaded, as indicated at 4, to enter a threaded opening 5 in one end of a turnbuckle 6. The other end portion or member 1 is provided at its inner end with a plurality of annular V-shaped grooves 7, each having one inclined and one abrupt or square wall. The end of the member or portion 1 is adapted to slide through a smooth bore or opening in the opposite end of the turnbuckle 6. The turnbuckle is provided adjacent to the smooth bore 8 and just inside of the same with oppositely-located slots or apertures 9, in which are placed dogs or catches 10, the said dogs or catches being fulcrumed intermediate their ends on cross-pins 11, passing through the turnbuckle. Each of the dogs 10 is provided at one end with a catch-lip 12 and has secured to its opposite end a leaf-spring 13, one end of which is fastened to said dog by means of a rivet or other suitable device, the free end of the spring bearing against the turnbuckle, so as to force the catch-lip 12 into engagement with any one of the notches 7 in the end portion or member 1 of the fastening device.

By means of the construction described it will be seen that the fastening device is readily extensible in length and that by thrusting the inner end of the portion or member 1 through the bore 8 at one end of the turnbuckle the oppositely-located dogs will automatically spring into engagement with the notches 7 and prevent the withdrawal of the part 1. The member 2 may also be adjusted relatively to the turnbuckle by turning either said member or the turnbuckle, as may be most convenient.

In applying the improved fastener the hooks 3 are passed through the eyes of the clips on the axle and also through the eyes of the shafts or pole, and after the turnbuckle 6 has been engaged with the member 2 the other member 1 is thrust into the turnbuckle, the dogs 10 automatically engaging the last-named member in the manner above described. The device is now turned downwardly against the axle, when the shafts or pole will be securely fastened in place.

By means of the construction described the axle-clips are prevented from spreading and are held against rattling and at the same time the shafts or pole may be instantly detached from the vehicle and as quickly replaced. The device also prevents the pole or shafts from dropping to the ground.

Having thus described my invention, what I claim as new, and desire to secure by Letters Patent, is—

1. In a fastening device for securing the poles or shafts of vehicles, the combination with similar members having their ends hooked or bent back as described and one of said members having its inner end threaded while the other member has its inner end annularly grooved, of a turnbuckle having a threaded opening in one end to engage the threaded member and a smooth opening in its opposite end to receive the grooved member, and a dog for engaging said grooved member, substantially as described.

2. In a fastening device for securing the shafts or poles of vehicles, a pair of substantially similar members having their opposite ends bent back to form hooks as described, one of said members having its inner end threaded and the other member provided at its inner end with a plurality of annular grooves, in combination with a turnbuckle provided at one end with a threaded opening to receive the threaded member and a smooth opening at its opposite end to receive the grooved member, and a spring-actuated dog connected to the turnbuckle and adapted to engage one of the grooves of the last-named member, substantially as described.

3. In a fastening device for securing the shafts or poles of vehicles, the combination with substantially similar members having their opposite ends hooked as described and provided one with a threaded inner end and the other with a series of notches at its inner end and on opposite sides, of a turnbuckle having a threaded opening at one end to receive the threaded member and having a smooth opening at its opposite end to receive the notched member, and oppositely-located, spring-actuated dogs mounted in recesses in said turnbuckle and engaging the notched member, substantially as described.

In testimony whereof I have signed this specification in the presence of two subscribing witnesses.

HENRY R. HARRIS.

Witnesses:
   G. W. WYNN,
   JUDGE HARRIS.